United States Patent
Munson, Sr.

[11] Patent Number: 5,906,357
[45] Date of Patent: May 25, 1999

[54] CONDUIT TORPEDO CONSTRUCTION

[76] Inventor: Karl Alvin Munson, Sr., 1935 Pheasant Run, Millville, N.J. 08332

[21] Appl. No.: 09/113,860

[22] Filed: Jul. 10, 1998

[51] Int. Cl.[6] .......................................................... B23Q 3/02
[52] U.S. Cl. ................................ 254/134.4; 254/134.3 FT
[58] Field of Search ..................... 254/134.3 FT, 254/134.3 CL, 134.3 R, 134.5

[56] References Cited

U.S. PATENT DOCUMENTS

| | | | |
|---|---|---|---|
| 382,257 | 5/1888 | Geyser | 254/134.4 |
| 1,036,114 | 8/1912 | Hodgman | 254/134.4 |
| 1,638,766 | 8/1927 | Grosvold | 254/134.3 FT |
| 1,851,435 | 3/1932 | Jessup | 254/134.4 |
| 2,794,197 | 6/1957 | Crane | 254/134.4 |
| 3,927,866 | 12/1975 | Linquist | 254/134.4 |
| 4,498,659 | 2/1985 | Brockelsby | 254/134.4 |
| 5,121,644 | 6/1992 | Grey et al. | 73/865.9 |
| 5,374,034 | 12/1994 | Flores, Sr. et al. | 254/134.4 |
| 5,442,136 | 8/1995 | Allen | 254/134.3 FT |
| 5,499,797 | 3/1996 | Sano et al. | 254/134.4 |
| 5,699,996 | 12/1997 | Boyle et al. | 254/134.4 |

*Primary Examiner*—David A. Scherbel
*Assistant Examiner*—Lee Wilson
*Attorney, Agent, or Firm*—Henderson & Sturm

[57] ABSTRACT

A torpedo construction 10 for threading wire and/or cable through a conduit 100. The torpedo construction 10 comprises a plurality of flexible rib elements 21, 22, 23, 24, formed integrally with one another and provided with a generally transparent membrane member 40, wherein selected ones 21, 23 of the rib elements are provided with rib extensions 26, 27 which are connected to a ring element 28 adapted to be connected to a tether 50.

12 Claims, 1 Drawing Sheet

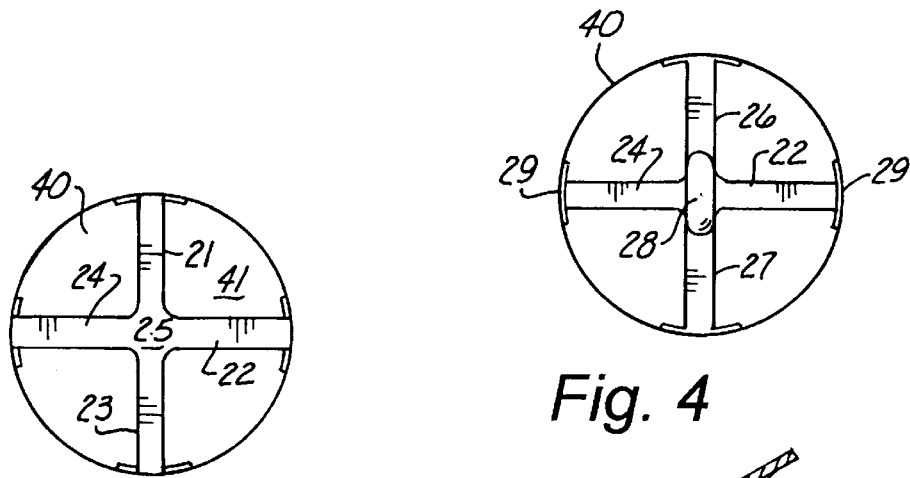
Fig. 3
Fig. 4
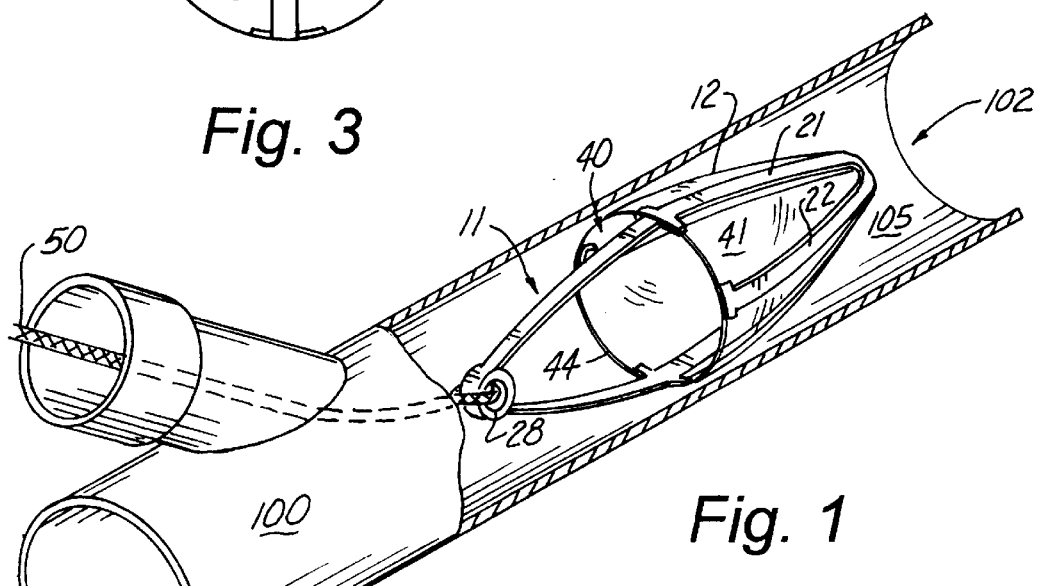
Fig. 1
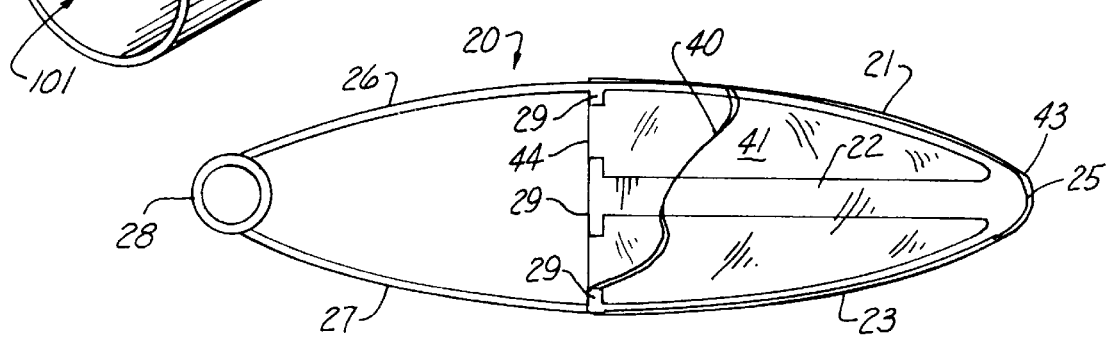
Fig. 2

CONDUIT TORPEDO CONSTRUCTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of line threading devices for elongated conduits in general, and in particular to a conduit conforming torpedo construction for accomplishing that objective.

2. Description of Related Art

As can be seen by reference to the following U.S. Pat. Nos. 5,121,644; 5,374,034; 5,499,797; and 5,699,996, the prior art is replete with myriad and diverse systems for threading wire and/or cable through a conduit.

While all of the aforementioned prior art constructions are more than adequate for the basic purpose and function for which they have been specifically designed, and at least one of them employs a pneumatically inflated cloth parachute, they are uniformly deficient with respect to their failure to provide a simple, efficient, and durable conduit torpedo that will closely conform to the walls of the conduit and employ an air impervious membrane that will reduce the amount of pneumatic pressure required to move the torpedo through the conduit.

As most electricians are aware, one of the most difficult chores that they encounter is the threading of wires and cable through elongated tubular conduits. In addition, while cloth parachutes have been employed in the past to pull an elongated tether along the length of a conduit, this particular approach has a number of significant drawbacks.

To begin with, the non-rigid collapsible nature of the cloth parachute results in many instances in the parachute bell collapsing within the conduit. Once the bell is collapsed, it is difficult, if not impossible to reinflate the bell to propel the parachute any further appreciable distance within the conduit.

In addition, the porous and fragile nature of the parachute material is susceptible to the rupturing of the bell membrane which will either result in the deflation of the bell or require excessively high pneumatic pressure to keep the torn membrane moving through the conduit.

As a consequence of the foregoing situation, there has existed a longstanding need among electricians for a new and improved type of conduit torpedo that is based on a reinforced outwardly biased parachute framework that will conform to the walls of the conduit even when pneumatic pressure is not being employed and the provision of such a construction is a stated objective of the present invention.

BRIEF SUMMARY OF THE INVENTION

Briefly stated, the pneumatically assisted conduit construction that forms the basis of the present invention comprises in general, a framework unit and a membrane unit which is operatively associated with a portion of the framework unit.

As will be explained in greater detail further on in the specification, the framework unit includes a framework member provided with a plurality of flexible rib elements formed on the forward end wherein the rib elements are operatively associated with a ring element formed on the rearward end and adapted to be connected to a tether.

In addition, the membrane unit includes a membrane member operatively connected to the rib elements to form a parachute bell that can capture forced air to propel the torpedo construction through a conduit wherein the flexible rib elements will maintain the membrane member in close proximity to the interior wall of the conduit.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the torpedo construction operatively deployed in a conduit;

FIG. 2 is a side elevation view of the torpedo construction;

FIG. 3 is a top plan view of the torpedo construction; and

FIG. 4 is a bottom plan view of the torpedo construction.

DETAILED DESCRIPTION OF THE INVENTION

As can be seen by reference to the drawings, and in particularly to FIG. 1, the conduit torpedo construction that forms the basis of the present invention is designated generally by the reference number 10. The construction 10 comprises in general, a framework unit 11, and a membrane unit 12. These units will now be described in seriatim fashion.

In the preferred embodiment of the invention illustrated in FIGS. 1 through 4, it can be seen that the framework unit 11 comprises a generally flexible one-piece framework member 20 including a plurality of framework rib elements 21, 22, 23, and 24 arranged in a generally cruciform configuration.

In addition, each of the rib elements 21 through 24 are formed integrally with one another and extend rearwardly from a central hub element 25.

Furthermore, as can best be seen by reference to FIGS. 1 and 2, two of the opposed rib elements 21 and 23 are provided with elongated rib extensions 26, 27 which are formed integrally with the respective rib elements 21 and 23, and one another, as well as a ring element 28 which forms the juncture of the rib extensions 26, 27.

Still referring to FIGS. 1 and 2, it can be seen that each of the rib elements 21 through 24 are provided with outwardly projecting flanges 29 which are circumferentially aligned with one another. The flanges 29 are disposed at the trailing end of two of the rib elements 22, 24 and also at the juncture of the rib extensions 26, 27 and the rib elements 21 and 23, respectively for reasons that will be explained presently.

Turning once more to FIGS. 1 through 4, it can be seen that the membrane unit 12 comprises a light transmissive membrane member 40 fabricated from transparent plastic 41 or the like, which will allow light to pass through the membrane member 40, such that upstream blockages within the conduit 100 can be detected by placing an illumination source on the downstream 101 end of the conduit 100 and peering through the upstream 102 of the conduit.

As shown in FIGS. 1 through 4, the front end 43 of the membrane member 40 extends from the central hub element 25 and rear end 44 of the membrane member 40 is fixedly secured to the flanges 29 on each of the rib elements 21 through 24 to form a quasi-permanently inflated parachute bell that will closely conform to the interior wall 105 of the conduit 100.

In addition, it should be noted that while the drawings show the membrane member 40 secured on the exterior of the framework member 20, this invention also contemplates a reversal of parts wherein the membrane member 40 is disposed on the interior of the framework member 20. This latter situation is particularly important in those situations wherein the interior wall 105 of the conduit 100 is abrasive and/or uneven in contour which might lead to the rupturing and/or tearing of the membrane member 40.

In order to operatively deploy the torpedo construction 10, the user would secure a tether 50 to the ring element 28 and insert the torpedo construction 10 into the downstream end 101 of the conduit. The framework member 20 would dispose the membrane member 40 in close proximity to the interior wall 105 of the conduit 100.

At this juncture, pressurized air would be introduced into the downstream end 101 of the conduit 100 to propel the torpedo construction towards the upstream end 102 of the conduit 100. Then once the torpedo 10 exits from the upstream end 102 of the conduit 100, the tether 50 may be employed to pull individual strands or bundles of cable or wires (not shown) along the length of the conduit 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A pneumatically assisted torpedo construction for threading wires and cables from the downstream end to the upstream end of a conduit wherein the torpedo construction comprises:

a framework unit including a generally flexible framework member adapted to be received in and closely conform to the interior wall of a conduit wherein the framework member has a front end provided with at least four rib elements and a rear end provided with a pair of rib elements which extend from the front end to the rear end of the framework member and form extensions of two of said at least four rib elements wherein the rear end of the framework member is provided with a ring element adapted to be connected to a tether; and a membrane unit including a flexible membrane member operatively connected to said at least four rib elements extending rearwardly from the front end of the framework member wherein each of said at least four rib elements are provided with an outwardly projecting flange which is operatively connected to said flexible membrane member.

2. The torpedo construction as in claim 1 wherein said flanges are circumferentially aligned relative to one another.

3. The torpedo construction as in claim 1 wherein the membrane member is disposed on the exterior surface of the plurality of rib elements.

4. The torpedo construction as in claim 1 wherein the membrane member is disposed on the interior surface of the plurality of rib elements.

5. The torpedo construction as in claim 1 wherein the membrane member is fabricated from a light transmissive material.

6. The torpedo construction as in claim 1 wherein the membrane member is fabricated from transparent plastic.

7. The torpedo construction as in claim 1 wherein at least two of said plurality of rib elements are disposed opposite to one another and provided with rib extensions which are operatively connected to said ring element.

8. The torpedo construction as in claim 7 wherein said rib elements, said rib extensions, and said ring element are formed integrally with one another.

9. A pneumatically assisted torpedo construction for threading wires and cables from the downstream end to the upstream end of a conduit wherein the torpedo construction comprises:

a framework unit including a generally flexible framework member having a front end, a rear end and an intermediate portion wherein the framework member is adapted to be received in and closely conform to the interior wall of a conduit wherein the framework member has a first pair of flexible rib elements which extend from the front end to the rear end of the framework member and a second pair of flexible rib elements which extend from the front end to the intermediate portion of the framework member, and are provided with a ring element adapted to be connected to a tether; and, a membrane unit including a flexible membrane member which extends from the front end to the intermediate portion of the framework member and which is operatively connected to said first and second pairs of flexible rib elements.

10. The construction as in claim 9 wherein the intermediate portion of the first pair of flexible rib elements are provided with outwardly projecting flanges connected to the membrane member.

11. The construction as in claim 9 wherein the end of the second pair of flexible rib elements are provided with outwardly projecting flanges connected to the membrane member.

12. The construction as in claim 9 wherein the intermediate portion of the first pair of flexible rib elements and the end of the second pair of flexible rib elements are provided with outwardly projecting flanges connected to the membrane member.

* * * * *